Nov. 10, 1959  L. G. HESS ET AL  2,912,464
HYDROFORMYLATION OF CONJUGATED DIENES
Filed Oct. 4, 1957
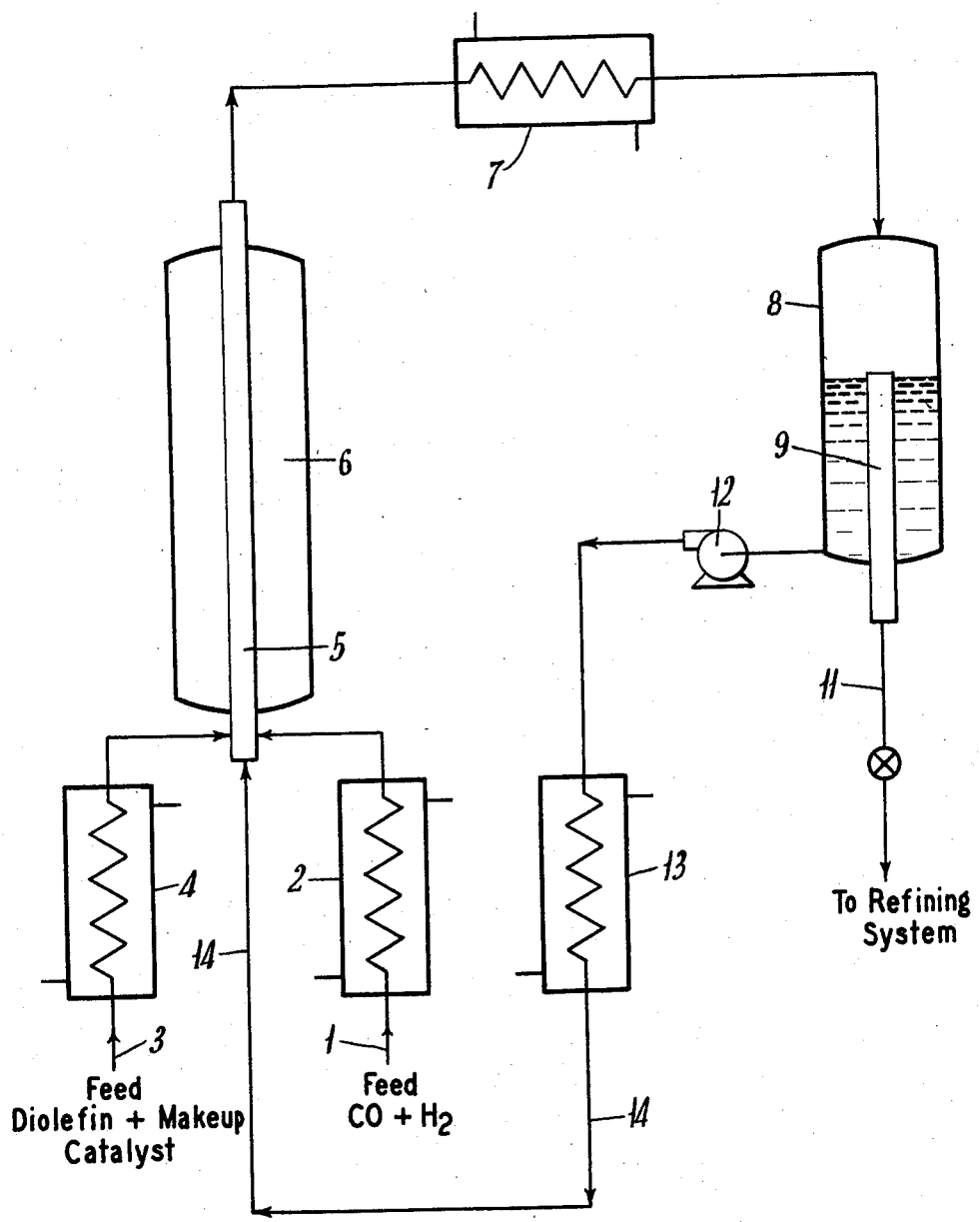
INVENTORS
LAWRENCE G. HESS
NORMAN R. COX
BY *Walter C. Kehm*
ATTORNEY United States Patent Office 2,912,464
Patented Nov. 10, 1959

2,912,464

HYDROFORMYLATION OF CONJUGATED DIENES

Lawrence G. Hess, Charleston, and Norman R. Cox, St. Albans, W. Va., assignors to Union Carbide Corporation, a corporation of New York Application October 4, 1957, Serial No. 688,361

7 Claims. (Cl. 260—604)

The present invention concerns the hydroformylation of conjugated dienes to aldehydes and alcohols. More particularly, this invention relates to the hydroformylation of conjugated diolefins with carbon monoxide and hydrogen to saturated aldehydes and alcohols having one more carbon atom than the diolefin by a process which includes the steps of conducting the hydroformylation mixture with a catalyst through a hydroformylation reactor, and recycling under full system temperature and pressure, a portion of the liquid products from the reactor.

Heretofore, it has not been economically feasible to hydroformylate conjugated diolefins with carbon monoxide and hydrogen because of the activity of the diene in hydroformylation systems. It has been shown by Adkins and Williams, J. Org. Chem. 17, 980–989 (1952), that conjugated dienes undergo extensive polymerization at a temperature below that required for catalytic hydroformylation, and that excessive amounts of catalyst are required to promote the reaction. It was postulated that at temperatures about 175° C. where hydroformylation would occur, the active catalyst was destroyed at a rate faster than the formation rate, and low yields of aldehydes consequently resulted. Further studies have indicated that this feature appears to be attributable to the reactivity of the conjugated dienes toward the hydroformylation catalysts at elevated temperatures. Generally, cobalt catalysts such as cobalt oxide, cobalt acetate, cobalt naphthenate and the like are employed in the hydroformylation reactions. In the presence of conjugated diolefinically unsaturated compounds such cobalt catalysts instead of decomposing, have been found to form complex organic cobalt compounds which are effective in promoting the hydroformylation only under extreme reaction conditions that contribute to the formation of undesirable by-products.

Several methods have been employed heretofore to overcome the tendency of the diene to form such complex organic cobalt compounds and to overcome the inherent sluggishness of the hydroformylation reaction. Attempts have been made to use excessive amounts of catalyst or to intermittently inject the diene into the reaction zone to counteract these adverse effects, such as was advocated by the patent to R. E. Brooks, U.S. 2,517,383, issued August 1, 1950. In this process, it was suggested that the production of high boiling and polymeric materials can be avoided by injecting butadiene into an extremely high pressure system containing the hydroformylation catalyst, carbon monoxide, and hydrogen. With cobalt catalysts, ideal hydroformylation temperatures above 175° C. could not be tolerated and only temperatures of up to 150° C. could be employed. As a consequence, the conversion and yields of the process were severely limited.

Brooks even attempted the use of the butadiene-cobalt complex as a catalyst. He found it necessary to employ extremely high pressures to effect conversion, generally of the order of 600 atmospheres and above, and still was able to secure a conversion of only 71 percent over a reaction period of 1.25 hours. Low conversions appear to be characteristic of this process under all conditions.

The rate of butadiene injection into such a system also had to be so adjusted that the molar ratio of butadiene to hydrogen did not exceed 1:2. This generally required intermittent addition of the butadiene, or carefully controlled injection of the butadiene to prevent the molar ratio from exceeding this figure. This cumbersome operation of the process coupled with the inherently low conversions militated against commercial exploitation of this process.

Another method which has been suggested to secure reasonable conversions in the hydroformylation of conjugated dienes, and to prevent the polymerization and catalyst complex formation heretofore encountered is by the use of lower alkanols such as methanol and ethanol in the reaction media. The alkanols serve in such a process as an inert diluent for the conjugated diolefin and the reaction products. This dilution reduces the tendency toward polymerization and condensation permitting higher hydroformylation conversions and rates, and improved yields. These lower alkanols presumably serve to inhibit the formation of the complex cobalt compound between the cobalt catalyst and the diene by the formation of loose compounds between the catalyst and the alkanol, which otherwise does not seriously hinder the effectiveness of the catalyst, but does inhibit the diene-cobalt complex formation. However, such activity has been demonstrated only with the lower alkanols.

The principal objections to this type of operation are the necessarily large amounts of alkanol required to effect the desired operation and in the difficulty of separating these lower alkanols from the aldehyde portion of hydroformylation products, particularly when employing the four and five carbon atom diolefinic reactants. Such difficulties have not only been expensive to solve but have almost ruled out commercial exploitation of the process.

It has also been proposed to partially hydrogenate the diene to a monoolefin before the hydroformylation in order to solve this problem, but this is not completely successful. This reduction step normally utilizes a nickel sulfide catalyst, which contaminates the product stream with odorous sulfur-containing compounds, which can in later aldehyde hydrogenation reactions poison the catalyst. The reactivation of this sulfide catalyst occurs at high temperatures using hydrogen sulfide as the regenerant, which also necessitates the use of corrosion-resistant equipment. Obviously this additional step of prehydrogenation of the diene also increases processing costs, and results in some loss of diene to alkanes and to polymeric products. Similarly, any monoolefins present in the diene stream may be hydrogenated to the alkane derivative and be lost for the hydroformylation reaction.

It is, therefore, an object of the present invention to provide a process for the hydroformylation of conjugated dienes to aldehydes and alcohols in high yields and conversion efficiencies.

It is a further object of this invention to prevent the formation of complex cobalt salts with cobalt-containing hydroformylation catalysts during the hydroformylation of conjugated dienes.

It is a further object of this invention to prevent the formation of the inactive form of the cobalt catalyst and thereby effect the hydroformylation of dienes without having to resort to severe reaction conditions to secure high conversion efficiencies of the olefinic reactant.

It is still a further object of this invention to permit hydroformylation of conjugated dienes by a process which assures substantially complete conversion of the diene before inactivation of the catalyst in the system as the diene complex.

According to the present invention, we have now discovered a method whereby acyclic conjugated dienes can be hydroformylated under mild reaction conditions to saturated aldehydes and alcohols in high yield without incurring serious catalyst complex formation, polymerization of the diene or excess by-product formation as heretofore encountered. The process of this invention comprises intimately contacting a mixture of the conjugated diene, carbon monoxide and hydrogen, along with a cobalt-containing hydroformylation catalyst in a suitable reactor at full system temperature and pressure, with at least 0.20 part by weight of the crude hydroformylated products containing the active hydroformylation catalyst per part of the total olefinic feed to the reactor, the said crude hydroformylated products also being maintained under full system temperature and pressure.

Basically, the contact of the crude hydroformylated products with the reactants is accomplished in a continuous system by a recycle of a portion of the hot effluent converter products under full system and pressure back to the point of initial diene addition, with means to mix the streams to get good contact of the crude products with the diene reactant. Only under such conditions can the hydroformylation of the diene take place under mild conditions and still secure high conversions of the diene reactant.

Without desiring to be bound by any particular theory, it is our belief that in this process, the crude liquid products serve as an inert diluent to decrease the rate of polymerization of the conjugated diene and at the same time provide an optimum concentration of the active form of the cobalt catalyst at the point of entry of the diolefin into the reactor. This is believed to sufficiently effect the hydroformylation reaction before the complex between the diene and the catalyst can form and before polymerization of the diene can take place.

The immediate recycle under full system temperature and pressure of these crude products has a number of highly desirable features making its use advantageous. It has been found to not only increase the flow rate through the reactor to assure turbulence and good mixing as well as efficient control of the reaction temperature, but it also provides an inert diluent which is the desired product rather than a third component which must be separated in subsequent recovery steps. It is necessary that the recycle be as close to system temperature as possible to prevent a possible quenching of the reaction. Cold recycle as has been employed in adiabatic reactions cannot be tolerated in this process.

We have found that by operating this process with the hot recycle of liquid products, the reaction can be sustained under mild conditions with a high conversion of olefinic reactants. Best operation of this process has been secured by recycling between about 0.5 to about 2.0 parts by volume per part of olefinic reactants fed to the reactor, although if desired even greater amounts can be recycled in the process. Amounts greater than about 5 to 10 parts of recycle per part of olefinic reactants serve little additional purpose in this process, and actually will decrease productivity by taking up available reactor space and diluting the reactants. For such reasons, an extremely high recycle rate is not desirable.

With this recycle of hot reaction products, the process can be operated at temperatures between 185° C. and 220° C. Above about 220° C., the catalyst begins to decompose, and the reaction is difficult or impossible to sustain. We prefer to operate in the range of about 195° C. to 215° C. for best control over the reaction.

Operating pressures as low as 4000 p.s.i.g. are possible in carrying out the process of this invention, with best results being secured at about 5000 p.s.i.g. Operating at pressures in excess of 6000 p.s.i.g. serves only to increase the amount of high boiling by-products and polymeric materials in the reaction.

Without the recycle of the hot reaction products, or with recycle in amounts less than 0.2 part by volume per part of olefinic feed, it is not possible to operate under such mild hydroformylation conditions, and either higher temperatures or higher pressures or both would be necessary to effect the conversion, and low yields and high by-product formation would result.

Generally, this process is best operated with acyclic conjugated dienes having from 4 to 6 carbon atoms, although dienes, including the cyclic dienes, containing up to about 12 carbon atoms can be employed if desired. Highly satisfactory results have been achieved with the 5 carbon atom linear diolefin containing only methyl side chains, such as isoprene and piperylene. It is a particularly desirable feature in this process that the diolefinic fractions can contain inert diluents, such as aromatic and aliphatic hydrocarbons, alkanols, and dialkyl ethers, and also monoolefinic compounds. Since it is not always possible to secure such conjugated dienes in pure form, and when possible, it is always quite an expensive purification step, such a feature is highly desirable from a commercial standpoint. The use of a monoolefinic reactant in the diolefin feed is quite often encountered, and in fact is desirable when diluents are to be employed. The use of monoolefinic reactants having the same carbon skeleton as the diene is highly desirable in that it yields the same aldehyde and alcohol under hydroformylation and, therefore, does not reduce the effective reactor volume in this process. In addition, the use of a monoolefin diluent does not require the further separation of a third constituent from the crude reaction product as is the case with the inert diluents. As employed herein, the term "olefinic reactant" or "olefinic compounds" encompasses not only diolefins and mixtures of diolefins, but also mixtures of diolefins and monoolefins containing at least a major proportion of diolefin.

The amount of carbon monoxide to be employed in this process is not narrowly critical, although it should be present in at least stoichiometric amounts equivalent to the olefinic compounds in the feed to the reactor. Hydrogen preferably is present in an amount sufficient to hydrogenate one double bond of the diolefin and to enter into the hydroformylation of the remaining double bond. However, excesses of hydrogen and carbon monoxide are easily tolerated in this process without serious adverse effect upon the conversion efficiency or the productivity. Best results are secured when the carbon monoxide:hydrogen molar ratio is between about 1:1 to 1:4. However, if desired, the ratio may be varied from about 1:0.5 to 1:8, depending upon the desired products, reaction conditions and economic considerations in the process.

It is preferable in carrying out the reaction that the carbon monoxide and hydrogen, either separately or in admixture, be heated to about the reaction temperature before contacting the conjugated diene reactant, although it can, if desired, contact cobalt catalyst at below reaction conditions, or even be heated to reaction temperature with the catalyst.

It is possible in this process to use any of the standard cobalt-containing hydroformylation catalysts, such as cobalt acetate, cobalt oxide, cobalt naphthenate, cobalt formate, cobalt carbonyl or hydrocarbonyl, and other catalyst such as cobalt metal, cobalt oleate, and cobalt carbonate. Preferably in this process the fresh makeup catalyst is employed in amounts of 0.5 parts by weight of contained cobalt per 100 parts of olefinic reactant although amounts between about 0.2 to 2.0 parts by weight of contained cobalt can be used. It is an advantageous feature of this process that only a minimum amount of makeup catalyst need be employed inasmuch as the recycle of crude reaction products under full system temperature and pressure will contain effective amounts of the catalyst in the active form. There is a further advantageous feature in this process in that the stable form of the cobalt salt can be used as the makeup catalyst and safely contacted with the conjugated diene even at full system temperature and pressure without incurring difficulties of the catalyst complex formation on contact with the diolefinic reactant. Also, the need for an induction period or for a separate catalyst generator for the formation of active catalyst in this process is not necessary. However before use in this process the makeup catalyst and the conjugated diene, either separately or in admixture should be heated to full system temperature before contacting the carbon monoxide and hydrogen.

It is not necessarily critical that the process of this invention be carried out in any particular design of reactor. While the process is preferably adaptable to a tubular type of reactor having a high length to diameter ratio, it may also be employed in a pressure vessel reactor wherein back-mixing is possible. It is, of course, necessary in this process that some degree of agitation of the reactants and temperature control over the reaction be maintained to secure optimum conversion and to prevent undesirable polymerization and/or by-product formation. Adequate temperature control can be maintained in this reaction by surrounding the tubular reactor with a temperature maintaining medium or by inserting cooling tubes within the reactor to remove exothermic heat of reaction for good temperature control.

Agitation in a back-mixing type of reaction vessel is best supplied by power driven agitator although other means can be employed as desired. In a tubular reactor, agitation is preferably provided by operating in the turbulent flow range, i.e. a Reynolds number of greater than 2100. In the turbulent range, conversion efficiencies and yields of aldehydes and alcohols are the highest, however suitable conversions and efficiencies can also be secured in the laminar or viscous flow region of operation.

In reference to the single attached drawing labeled Figure 1, a better understanding of the operation of the process may be obtained. The drawing however, represents only a preferred embodiment of this invention in conducting the reaction in a tubular reactor.

The feed mixture of synthesis gas 1 (carbon monoxide and hydrogen mixture) under system pressure of at least 4000 p.s.i.g. is heated to about the reaction temperature in preheater 2 while the diolefin and makeup catalyst, either separately or in admixture 3 are also heated to about the reaction temperature in preheater 4 and mixed at the entrance of reactor 5 with a portion of the crude liquid products 14 and fed to reactor 5. The reactor is illustrated as a tubular reactor surrounded by the heat-exchange medium 6. The effluent of the hydroformylation reactor is removed from the reactor and fed to product cooler 7 for condensation of the liquid products of the reaction. The effluent of the product cooler is then fed to separator 8 for separation of liquid and gaseous products. Separator 8 consists of a receiving vessel, preferably fitted with a standpipe 9 in order to maintain liquid level. The recycle portion of the crude liquid products is removed by pump 12 and the remaining portion of the crude liquid products is sent to the refining system by line 11 through a motor valve system. The portion of crude liquid products to be recycled is first preheated in recycled preheater 13 before being returned to the reactor 5 through line 14.

The following examples are illustrative of our invention. Unless otherwise indicated, all parts are in parts by weight.

Example I

A hydrocarbon mixture containing 55.3 mol percent of $C_5$ diolefins (isoprene and piperylene), 16.5 mol percent $C_5$ olefins (pentenes), 3.9 mol percent $C_5$ cyclic diolefins, and the remainder inert hydrocarbons and ethers was mixed with one percent by weight cobalt oxide and continuously fed to the inlet of a jacketed reactor at a rate of about 2000 ml. per hour. The reactor was a stainless steel tube, about one inch I.D. by about 12 feet long, having a volume of about 1.6 liters, and jacketed its entire length for Dowtherm heating. The outlet of the reactor was connected to a cooler to condense the liquid products formed. Liquid products were collected under full system pressure in a separator having a centrally located standpipe to maintain constant liquid level. The jacket temperature of the reactor was maintained at 200° C. during the reaction and the entire system maintained at 6000 p.s.i. by synthesis gas pressure (1:1 mol mixture of carbon monoxide and hydrogen). The synthesis gas was fed to the reactor at the rate of 52.4 cubic feet per hour and mixed with the $C_5$ diolefin-catalyst stream at the inlet of the reactor. The space velocity of the olefinic material in the reaction was 1.0 reciprocal hour.

A portion of the liquid products from the separator was reheated to reaction temperature and recycled under full system pressure to the inlet of the reactor at a rate so that the volume ratio of hydrocarbon (olefin plus diolefin) feed to recycled products was 1 to 2.

Equilibrium was reached in 5.5 hours in continuous operation and thereafter operated for an additional five hours. Productivity during this time was 41 pounds of $C_6$ aldehydes and alcohols per cubic foot of reactor volume per hour. This amounted to a 73 percent yield of $C_6$ aldehyde-alcohols and a 95 percent conversion of the olefinic reactants in the feed.

Example II

Operating in the continuous manner as set forth in Example I with the same diolefin feed stock with 0.25 percent by weight of cobalt oxide at 200° C. under 4500 p.s.i. pressure of 1.0 reciprocal hour, there was secured a productivity of 46 lbs. of $C_6$ aldehydes and alcohols per cubic foot of reactor volume per hour. An olefin conversion of 96 percent was achieved with a yield of 41.9 percent to $C_6$ aldehydes and 35.1 percent to $C_6$ alcohols. Recycle was under full system temperature and pressure at a rate to amount to two volumes per volume of olefin in the feed.

In another run, increasing the pressure to 6000 p.s.i. and the catalyst to 1.7 percent by weight of cobalt acetate gave an olefin conversion of 94.6 percent with a yield of $C_6$ aldehydes and alcohols of 68.5 percent.

Example III

In a series of runs, a temperature traverse and a space velocity traverse were made in the same equipment and in the same procedure and flow rates as in Example I, unless otherwise noted. All runs were made using 0.5 to 1.0 percent by weight cobalt oxide, and conducted at 6000 p.s.i. using a 1 to 1 mol mixture of carbon monoxide and hydrogen with an inlet space velocity of olefinic reactants of 1.0 reciprocal hour. All recycle was under full system temperature and pressure at a rate to amount to two volumes per volume of olefinic reactants in the feed.

Over a temperature range of 195° to 215° C., operation was very satisfactory with efficiencies remaining fairly constant to $C_6$ aldehydes and alcohols, to saturated $C_6$ paraffins, and to residues of 75 percent, 5 percent and 20 percent, respectively.

Operation over a temperature range from 195° C. to 185° C. was more difficult, and conversion efficiency progressively decreased until reaction stopped completely at the lower temperature.

Over a space velocity range of 1.0 to 2.0 reciprocal hours at 210° C., conversions of olefinic reactants were above 90 percent, with efficiencies to $C_6$ aldehydes and alcohols, to saturated paraffins and to residues remaining fairly constant at about 75 percent, 5 percent and 20 percent, respectively. Production ratios however increased from about 42 pounds to 80 pounds to $C_6$ aldehydes and alcohols per cubic foot of reactor volume per hour as the space velocity was increased from 1.0 to 2.0 reciprocal hours.

When conducting the process of this invention in a tubular reactor, it is preferred that the reactor have a minimum length to diameter ratio of about 1000:1. When operating under turbulent flow conditions in the reactor, length to diameter ratios of 1000:1 to about 15,000:1 are particularly desired, at linear velocities of from about 1 foot per second to about 30 feet per second. With the tubular reactor, the diameter of the tube is not necessarily critical and depends primarily upon the desired linear velocity, residence time, and length to diameter ratios. Tubes having diameters of about ¾ inch to about 4 inches are particularly desired, with the length of reactor preferably between about 750 inches to about 5000 feet.

We claim:

1. In a process for the hydroformylation of olefinic reactants containing at least a major portion of an acyclic conjugated diene having between 4 and 12 carbon atoms, to produce hydroformylation products comprising aldehydes and alcohols, which comprises heating a mixture of the said olefinic reactants, a cobalt-containing hydroformylation catalyst, carbon monoxide and hydrogen in which the carbon monoxide and hydrogen are present in at least stoichiometric amounts, at a temperature between above 185° C. to 220° C. and at a pressure of at least 4000 p.s.i.g., the improvement which comprises conducting the hydroformylation reaction in the presence of from about 0.2 to about 10 parts by volume per part of the olefinic reactants of recycled hydroformylation products, said recycled products being contacted with the olefinic reactants while at a temperature between above 185° C. to 220° C. and at a pressure of from 4,000 to 6,000 p.s.i.g.

2. In a process for the hydroformylation of olefinic reactants containing at least 50 percent by weight of an acyclic conjugated diene having between 4 and 12 carbon atoms, to produce hydroformylation products comprising aldehydes and alcohols, which comprises heating a mixture of the said olefinic reactants, a cobalt-containing hydroformylation catalyst, carbon monoxide and hydrogen in which the carbon monoxide and hydrogen are present in at least stoichiometric amounts, at a temperature between above 185° C. to 220° C. and at a pressure of at least 4000 p.s.i.g., the improvement which comprises conducting the hydroformylation reaction in the presence of from about 0.2 to about 10 parts by volume per part of the olefinic reactants of recycled hydroformylation products, said recycled products being contacted with the olefinic reactants while at a temperature between above 185° C. to 220° C. and at a pressure of from 4,000 to 6,000 p.s.i.g.

3. In a process for the hydroformylation of olefinic reactants containing at least a major portion of an acyclic conjugated diene having between 4 and 12 carbon atoms, to produce hydroformylation products comprising aldehydes and alcohols, which comprises heating a mixture of the said olefinic reactants, a catalytic amount of a cobalt-containing hydroformylation catalyst, carbon monoxide and hydrogen, in which carbon monoxide and hydrogen are present in molar ratios of between about 1:0.5 to 1:8, in at least stoichiometric amounts equivalent to the said olefinic reactants, at a temperature between above 185° C. and 220° C. and at a pressure of at least 4,000 p.s.i.g., the improvement which comprises conducting the hydroformylation reaction in the presence of from about 0.2 to about 10 parts by volume per part of the olefinic reactants of recycled hydroformylation products, said recycled products being contacted with the olefinic reactants while at a temperature between above 185° C. to 220° C. and at a pressure of from 4,000 to 6,000 p.s.i.g.

4. A process as claimed in claim 3 wherein the recycled hydroformylation product is between 0.5 to 2.0 parts by volume per part of olefinic reactants.

5. A process as claimed in claim 4 wherein the olefinic reactants contain at least 50 percent by weight of isoprene and piperylene.

6. A process as claimed in claim 3 wherein the reaction is conducted in a tubular reactor having a length to diameter ratio of at least 1000:1.

7. In a process for the hydroformylation of olefinic reactants containing major proportion of an acyclic conjugated diene having between 4 and 6 carbon atoms, to produce hydroformylation products comprising aldehydes and alcohols, which comprises admixing the said olefinic reactants in a reactor with a catalytic amount of a cobalt-containing hydroformylation catalyst, at least stoichiometric amounts of carbon monoxide and hydrogen in a molar ratio of 1:0.5 to 1:8 of carbon monoxide to hydrogen at a temperature of between above 185° C. to 220° C. and at a pressure of from 4,000 to 6,000 p.s.i.g., the improvement which comprises recycling from about 0.2 to about 10 parts by volume per part of olefinic reactants of the hydroformylation product from the effluent of said reactor and contacting said recycled product with olefinic reactants while at a temperature of between above 185° C. and 220° C. and at a pressure of from 4,000 to 6,000 p.s.i.g.

References Cited in the file of this patent

UNITED STATES PATENTS

| | | |
|---|---|---|
| 2,437,600 | Gresham et al. | Mar. 9, 1948 |
| 2,462,448 | Whitman | Feb. 22, 1949 |
| 2,497,303 | Gresham et al. | Feb. 14, 1950 |
| 2,517,383 | Brooks | Aug. 1, 1950 |
| 2,549,454 | Gresham et al. | Apr. 17, 1951 |
| 2,557,701 | Smith | June 19, 1951 |
| 2,600,571 | Prichard | June 17, 1952 |
| 2,754,331 | Smith | July 10, 1956 |
| 2,790,006 | Bordenca | Apr. 23, 1957 |
| 2,802,843 | Tramm et al. | Aug. 13, 1957 |

FOREIGN PATENTS

| | | |
|---|---|---|
| 702,224 | Great Britain | Jan. 13, 1954 |

OTHER REFERENCES

Adkins et al.: J. Organic Chemistry, vol. 17, pp. 980–7 (1952).

UNITED STATES PATENT OFFICE
CERTIFICATE OF CORRECTION

Patent No. 2,912,464 — November 10, 1959

Lawrence G. Hess et al.

It is hereby certified that error appears in the printed specification of the above numbered patent requiring correction and that the said Letters Patent should read as corrected below.

Column 3, line 21, after "system" insert -- temperature --; column 6, line 15, for "reaction" read -- reactor --.

Signed and sealed this 4th day of October 1960.

(SEAL)
Attest:

KARL H. AXLINE
Attesting Officer

ROBERT C. WATSON
Commissioner of Patents